(12) United States Patent
Ishikawa

(10) Patent No.: US 7,820,778 B2
(45) Date of Patent: Oct. 26, 2010

(54) LIGHT GUIDE MEMBER AND ILLUMINATION UNIT

(75) Inventor: Yasuhiro Ishikawa, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 59 days.

(21) Appl. No.: 12/297,786

(22) PCT Filed: Apr. 23, 2007

(86) PCT No.: PCT/JP2007/058719

§ 371 (c)(1),
(2), (4) Date: Oct. 20, 2008

(87) PCT Pub. No.: WO2007/125854

PCT Pub. Date: Nov. 8, 2007

(65) Prior Publication Data

US 2009/0175052 A1 Jul. 9, 2009

(30) Foreign Application Priority Data

Apr. 28, 2006 (JP) ............................. 2006-126018

(51) Int. Cl.
C08G 64/00 (2006.01)
C08G 63/02 (2006.01)

(52) U.S. Cl. ............... 528/196; 362/97.1; 362/611; 362/629; 428/220; 524/114; 524/115; 524/501; 524/537; 524/611

(58) Field of Classification Search ............... 362/97.1, 362/611, 629; 428/220; 524/114, 115, 502, 524/537, 611; 525/187, 190
See application file for complete search history.

(56) References Cited

U.S. PATENT DOCUMENTS

2009/0093583 A1* 4/2009 Kawato et al. ............... 524/502

2009/0185363 A1* 7/2009 Ishikawa ................... 362/97.1
2009/0186208 A1* 7/2009 Ishikawa et al. ............ 428/220

FOREIGN PATENT DOCUMENTS

| JP | 63 89539 | | 4/1988 |
|---|---|---|---|
| JP | 11 158364 | | 6/1999 |
| JP | 2002 348367 | | 12/2002 |
| JP | 2003 96179 | | 4/2003 |
| JP | 2003 192780 | | 7/2003 |
| JP | 2003 261670 | | 9/2003 |
| JP | 2004 027107 | | 1/2004 |
| JP | 2004027107 | * | 1/2004 |
| JP | 2004 149745 | | 5/2004 |
| JP | 2004149745 | * | 5/2004 |
| JP | 2005 60628 | | 3/2005 |
| JP | 2005 283761 | | 10/2005 |
| JP | 2005 298710 | | 10/2005 |
| JP | 2005298710 | * | 10/2005 |
| WO | WO 97/02744 | * | 1/1997 |

OTHER PUBLICATIONS

U.S. Appl. No. 12/299,216, filed Oct. 31, 2008, Ishikawa, et al.
U.S. Appl. No. 12/299,121, filed Oct. 31, 2008, Ishikawa.
U.S. Appl. No. 11/994,031, filed Dec. 27, 2007, Kawato, et al.

* cited by examiner

Primary Examiner—Terressa M Boykin
(74) Attorney, Agent, or Firm—Oblon, Spivak, McClelland, Maier & Neustadt, L.L.P.

(57) ABSTRACT

Disclosed is a light guide member which includes a polycarbonate copolymer having a repeating unit represented by the formula (I) and a repeating unit represented by the formula (II), which is thin, and which is free from thermal degradation (yellowing) or deterioration in properties caused by the generation of a gas, such as a light guide plate formed of a polycarbonate material. Also disclosed is an illumination unit using the light guide member.

9 Claims, No Drawings

LIGHT GUIDE MEMBER AND ILLUMINATION UNIT

CROSS REFERENCE TO RELATED APPLICATION

This application is a 371 of International Application No. PCT/JP07/58719, filed on Apr. 23, 2007, the text of which is incorporated by reference and claims the priority of Japanese Patent Application No. 2006-126018, filed on Apr. 28, 2006, the text of which is also incorporated by reference.

TECHNICAL FIELD

The present invention relates to a light guide member and an illumination unit, and more specifically, to a light guide member obtained by using a polycarbonate copolymer having a specific structure such as a light guide plate and an illumination unit including the light guide member and a light source.

BACKGROUND ART

A light guide plate is one of the optical members to be used in a backlight unit for any one of various display apparatuses. A polycarbonate resin produced from bisphenol A has been used as a material for a light guide plate of a size as small as one to seven inches. A polycarbonate resin (which may hereinafter be abbreviated as "PC") produced from, for example, bisphenol A is suitable for a light guide plate to be mounted on, for example, a portable phone, a portable game machine, or a car navigation system because the PC is excellent in transparency and thermal resistance, has low hygroscopic property, and mechanical characteristics (see, for example, Patent Document 1).

In addition, an optical polycarbonate excellent in resistance to reflow soldering has been known, and a light guide plate has been proposed as an application of the polycarbonate (see, for example, Patent Document 2). However, when a PC composition described in Patent Document 1 or 2 is molded into a light guide plate by injection molding, it becomes difficult to achieve the target reduction in thickness of the light guide plate because the composition has low flowability.

On the other hand, with the advent of reductions in thickness and size of a light source for use in an edge light type backlight, space savings based on a reduction in thickness have been demanded also of a light guide plate itself in recent years.

In addition, a copolymer composed of α,α'-bis(4-hydroxyphenyl)-m-diisopropylbenzene and 2,2-bis(4-hydroxyphenyl)propane (bisphenol A) has been known (see, for example, Patent Document 3).

Known applications of the copolymer are an optical lens (see, for example, Patent Documents 4 and 5) and an optical disk substrate (see, for example, Patent Document 6) because the copolymer has low water absorption property and low birefringence. At present, however, the copolymers have not been used in light guide plates yet.

When a PC produced from bisphenol A is used as a material for a light guide plate, the temperature of a cylinder of an injection molder at the time of the injection molding of the material with the molder must be extremely high, or the injection speed of the material must be extremely high in order that the thickness of a light guide plate to be obtained may be reduced. In this case, however, it becomes difficult to obtain a light guide plate having satisfactory performance owing to, for example, the following problem: the color tone of a light guide plate to be obtained becomes yellowish owing to the temperature or shear discoloration of the resin, or a gas is generated.

In addition, the use of an acrylic resin (hereinafter abbreviated as "PMMA") as a material for a light guide plate involves the emergence of the following problem: the resin cracks at the time of its molding or assembling owing to its insufficient strength.

Further, the PMMA suffers from the following problem: even if the PMMA can be molded, the PMMA will absorb moisture to deform owing to its high hygroscopicity.

In view of the foregoing, a light guide member made of a polycarbonate resin material such as a light guide plate having the following characteristics has been requested: the member can overcome the above-mentioned problems, and can be additionally reduced in thickness.

Patent Document 1: JP 11-158364 A
Patent Document 2: JP 2005-60628 A
Patent Document 3: JP 63-89539 A
Patent Document 4: JP 2003-192780 A
Patent Document 5: JP 2003-96179 A
Patent Document 6: JP 2002-348367 A

DISCLOSURE OF THE INVENTION

The present invention has been made with a view to solving the problems of the above-mentioned conventional art, and, in particular, an object of the present invention is to provide a light guide member composed of a polycarbonate material and having the following characteristics such as a light guide plate and an illumination unit using the light guide member: the member is thin, and is free from thermal deterioration (yellowing) or a reduction in its performance caused by the generation of a gas.

The inventors of the present invention have made extensive studies with a view to achieving the above object. As a result, the inventors have found that the use of a polycarbonate copolymer having a specific repeating unit in a light guide member such as a light guide plate can provide a thin light guide member such as a light guide plate having the following characteristics: the member is excellent in transparency, has low water absorption property, a high refractive index, and low birefringence, is free from yellowing due to the thermal deterioration of the copolymer as a resin, and has a good color tone and a sufficient strength.

Specifically, the invention provides:

(1) a light guide member, which is obtained by using a polycarbonate copolymer having repeating units represented by the following formulae (I) and (II);

[Chem 1]

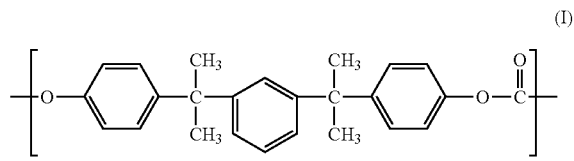

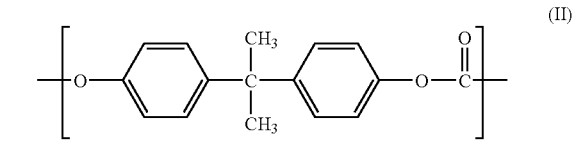

(2) a light guide member according to the item (1), in which the polycarbonate copolymer has a viscosity number of 30 to 70;

(3) a light guide member according to the item (1) or (2), in which the repeating units each represented by the formula (I) and the repeating units each represented by the formula (II) are contained at a molar ratio of 1:99 to 50:50;

(4) a light guide member according to any one of items (1) to (3), in which the light guide member comprises a light guide plate; and (5) an illumination unit including the light guide member according to any one of the items (1) to (4) and a light source.

BEST MODE FOR CARRYING OUT THE INVENTION

Polycarbonate Copolymer

A polycarbonate copolymer used in the light guide member of the present invention has repeating units represented by the following formulae (I) and (II).

[Chem 2]

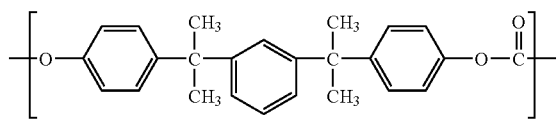

(I)

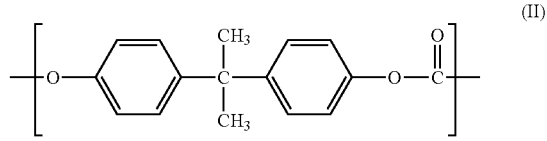

(II)

The copolymer can be produced by a conventional production method, that is, a production method referred to as an interfacial polymerization method or an ester exchange method.

The copolymer can be produced by, for example, an interfacial polymerization method involving causing, in a solvent such as methylene chloride in the presence of a known acid acceptor, a polycarbonate oligomer obtained by a reaction between 2,2-bis(4-hydroxyphenyl)propane represented by the following formula (III) (hereinafter referred to as "bisphenol A") and a carbonate precursor such as phosgene and α,α'-bis(4-hydroxyphenyl)-m-diisopropylbenzene represented by the following formula (IV) (hereinafter referred to as "bisphenol M") to react and polymerization with each other.

[Chem 3]

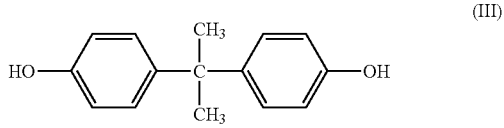

(III)

[Chem 4]

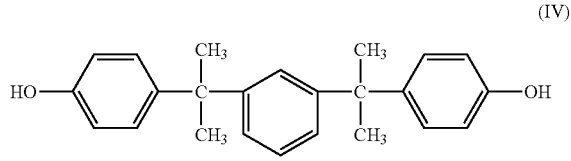

(IV)

Alternatively, the copolymer can be produced by a polymerization method based on an ester exchange reaction between a carbonate precursor such as diphenyl carbonate and each of bisphenol A and bisphenol M.

Molar Ratio Between Repeating Units Each Represented by Formula (I) and Repeating Units Each Represented by Formula (II)

In the polycarbonate copolymer used in the light guide member of the present invention, a molar ratio between the repeating units each represented by the formula (I) and the repeating units each represented by the formula (II) is preferably 1:99 to 50:50, or particularly preferably 1:99 to 30:70.

As long as the molar ratio between the repeating units each represented by the formula (I) and the repeating units each represented by the formula (II) in the polycarbonate copolymer falls within the range of 1:99 to 50:50, the composition can satisfy mechanical physical properties and such flowability that the composition can be reduced in thickness, so the composition can be favorably molded into a thin or large-sized light guide plate.

Accordingly, upon polymerization to obtain the polycarbonate copolymer, a copolymerization reaction between bisphenol M and bisphenol A has only to be performed in such a manner that a molar ratio between the respective repeating units falls within the above range.

In addition, upon polymerization to obtain the polycarbonate copolymer, a repeating unit except the repeating units represented by the above general formulae (I) and (II) can be introduced. To be specific, a repeating unit represented by any one of the following formulae (V) to (VIII) can be introduced.

[Chem 5]

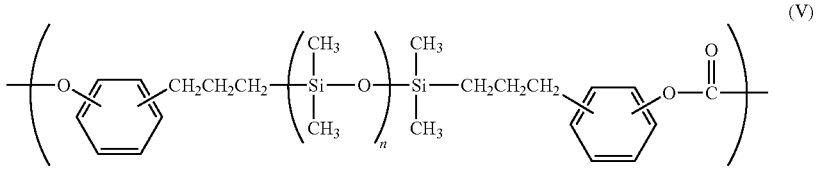

(V)

(n represents a number of 1 to 60.)

[Chem 6]

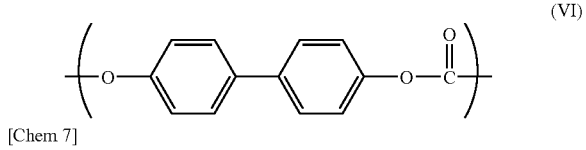
(VI)

[Chem 7]

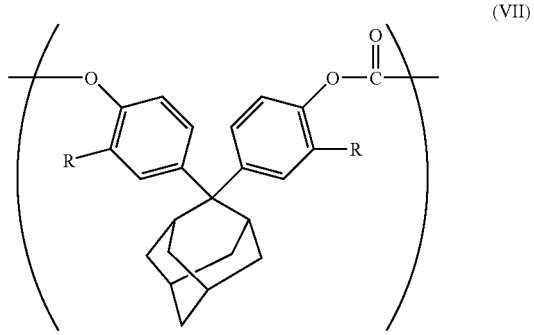
(VII)

(R represents H or an alkyl group having 1 to 12 carbon atoms.)

[Chem 8]

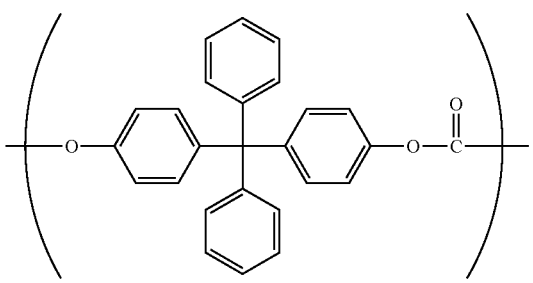
(VIII)

One kind of the repeating units represented by the above general formula or formula (V) to (VIII) may be introduced into the repeating units represented by the above formulae (I) and (II) alone, or two or more kinds of them may be introduced into the repeating units represented by the above formulae (I) and (II) in combination. When a silicone compound residue represented by the general formula (V) is used as a repeating unit, resistance to staining and abrasion resistance are imparted to the copolymer. When a repeating unit derived from 4,4'-dihydroxybiphenyl represented by the formula (VI) is introduced, the flame retardancy of the copolymer is improved. In addition, when a repeating unit having an adamantane skeleton represented by the general formula (VII) is introduced, the thermal resistance of the copolymer is improved. When a repeating unit derived from bis(4-hydroxyphenyl)diphenylmethane represented by the formula (VIII) is introduced, the thermal resistance of the copolymer can be improved.

Carbonyl Source

Phosgene used in a general interfacial polycondensation method for polycarbonate, triphosgene, bromophosgene, or the like can be used as a carbonyl source of the polycarbonate to be used in the present invention. It should be noted that diallyl carbonate or the like can be used in the case of an ester exchange method while carbon monoxide or the like can be used in the case of an oxidative carbonylation method.

Terminal Terminator

Anyone of various terminal terminators can be used as a terminal terminator for the polycarbonate copolymer to be used in the light guide member of the present invention as long as the terminal terminator is typically used in the polymerization of polycarbonate. In general, any one of the monohydric phenols can be used. Examples of the monohydric phenols include phenol and phenols each having a linear or branched (long-chain) alkyl group, an aliphatic polyester group, and phenols each having an aromatic compound as a substituent.

Specifically, phenol, o-, m-, p-cresol, p-tert-butylphenol, p-tert-amylphenol, p-tert-octylphenol, p-cumylphenol, p-methoxyphenol, p-phenylphenol, isooctylphenol, and monoalkyl phenols having a linear or branched alkyl group with an average carbon atom number of 12 to 35 at ortho-, meta-, or para-position, 9-(4-hydroxyphenyl)-9-(4-methoxyphenyl)fluorene, 9-(4-hydroxy-3-methylphenyl)-9-(4-hydroxy-3-methylphenyl)-9-(4-methoxy-3-methylphenyl)fluorene, 4-(1-adamantyl) phenol, and the like are exemplified. Of those, p-tert-butylphenol, p-cumylphenol, p-tert-octylphenylphenol, and phenol are preferable.

Branching Agent

As the branching agent in the present invention, compounds having 3 or more functional groups such as:
1,1,1-tris(4-hydroxyphenyl)ethane;
4,4'-[1-[4-[1-(4-hydroxyphenyl)-1-methylethyl]phenyl]ethylidene]bisphenol;
α,α',α"-tris(4-hydroxyphenyl)-1,3,5-triisopropylbenzene;
1-[α-methyl-α-(4'-hydroxyphenyl)ethyl]-4-[α',α'-bis(4"-hydroxyphenyl)ethyl]benzene; phloroglycine, trimellitic acid; and isatinbis(o-cresol) may be used.

Viscosity Number of Polycarbonate Copolymer

The polycarbonate copolymer to be used in the light guide member of the present invention has a viscosity number of 30 to 70, that is, 10,000 to 28,000 in terms of a viscosity average molecular weight (Mv) in terms of Mv. The composition can satisfy mechanical physical properties and such flowability that the composition can be reduced in thickness, so the composition can be molded into, for example, a large-sized light guide plate well as long as the copolymer has a viscosity number of 30 to 70.

The viscosity number is a value measured in conformance with ISO 1628-4 (1999).

Various Additives

Any one of various additives may be blended into the polycarbonate resin copolymer used in the light guide plate of the present invention to such an extent that an effect of the present invention is not impaired. Examples of the additives include: antioxidants such as a hindered phenol antioxidant, an ester antioxidant, a phosphate antioxidant, and an amine antioxidant; UV absorbers such as a benzotriazole UV absorber, a benzophenone UV absorber, a malonate UV absorber, and an oxalylanilide UV absorber; light stabilizers such as a hindered amine light stabilizer; internal lubricants such as an aliphatic carboxylate internal lubricant, a paraffin internal lubricant, a silicone oil, and a polyethylene wax; and flame retardants, flame retardant aids, colorants, antistatic agents, antiblocking agents, release agents, and lubricants in common use.

Upon production of the light guide member of the present invention, first, a molding material containing the polycarbonate copolymer is prepared. The molding material can be prepared by melting and kneading the polycarbonate copolymer and any one of the various additives to be used as desired with known means such as a ribbon blender, a drum tumbler, a Henschel mixer, a Banbury mixer, a uniaxial screw extruder, a biaxial screw extruder, a Ko-kneader, or a multi-axial screw extruder. An appropriate temperature at which the mixture is heated at the time of the kneading is typically 250 to 320° C.

The light guide member of the present invention can be produced by subjecting the molding material thus prepared to injection molding under, for example, the following conditions: a temperature of a cylinder of an injection molder for use in the injection molding of about 240 to 400° C., or preferably 280 to 380° C. and a temperature of a die of the molder of about 60 to 130° C.

The light guide member of the present invention is of, for example, a plate-like shape, a rod-like shape, or a spherical shape; a light guide plate of the plate-like shape out of the shapes is preferable. An illumination unit of, for example, a plate-like shape, a rod-like shape, or a spherical shape can be constituted by causing the light guide member to guide light from, for example, an LED as a light source. The illumination unit can be suitably used as an illumination in a back light of a liquid crystal display apparatus, vehicle, housing, or interior or design parts.

Light Guide Plate

The dimensions and shape of the light guide plate in the light guide member of the present invention are not particularly limited, and it is sufficient that a flat plate, curve plate, or the like having a thickness of about 0.1 to 3 mm be molded out of the composition. That is, the shape of the light guide plate is not necessarily limited to a flat plate shape, and has only to be appropriately selected depending on a purpose and an application; for example, the light guide plate may be a curve plate having a lens effect. For example, the light guide plate may be of a structure having such a wedge-shaped section that the thickness of the light guide plate gradually reduces as the distance of the light guide plate from a light source increases. Alternatively, the light guide plate may be of such a structure that the front surface of a sheet luminous body is integrally provided with a display portion formed of another member.

A uniform sheet luminous body can be obtained by transferring a microprism onto one or both of the front surface and rear surface of the light guide plate in order that a light scattering layer may be formed by using a stamper at the time of the molding of the plate out of the composition.

The above-mentioned microprism, which is not particularly limited, is preferably V groove-shape, reverse V convex shape, or hemispherical. In addition, the microprism has a height of preferably 10 to 300 µm, more preferably 20 to 200 µm, or particularly preferably 50 to 100 µm.

It should be noted that dot pattern printing can be performed, or the plate can be cut with a conical drill for the formation of the light scattering layer.

According to the present invention, there is also provided an illumination unit including a light guide member and a light source.

For example, an illumination unit composed of an edge type surface light source body such as a liquid crystal television set, a personal computer, or a display is formed by placing a light source on a thick portion of a wedge-shaped light guide plate. A selfluminous body such as a cold-cathode tube, an LED, or any other organic EL device as well as a fluorescent lamp can be used as the light source. When the illumination unit of the present invention is adopted for a liquid crystal display apparatus, the mode according to which the unit emits light may be either a backlight mode or a frontlight mode.

According to the present invention, a thin light guide member such as a light guide plate having the following characteristics can be provided by using a polycarbonate copolymer having a specific structure: the member is free from yellowing due to the thermal deterioration of the copolymer as a resin, and has a good color tone and a sufficient strength. In addition, a thin illumination unit can be constituted by combining the light guide member of the present invention such as a light guide plate and a light source, and a reduction in thickness of, for example, a liquid crystal display apparatus can be achieved by using the illumination unit.

EXAMPLES

Next, the present invention will be described in more detail by way of examples. However, the present invention is by no means limited by these examples.

Production Example 1

Step of Synthesizing Oligomer

Sodium dithionite was loaded at a concentration of 2,000 ppm with respect to bisphenol A (which may hereinafter be abbreviated as "BPA") to be dissolved later into a 5.6% by mass aqueous solution of sodium hydroxide. BPA was dissolved in the mixture so that the concentration of BPA was 13.5% by mass. Thus, an aqueous solution of sodium hydroxide containing BPA was prepared.

The aqueous solution of sodium hydroxide containing BPA, methylene chloride, and phosgene were continuously passed through a tubular reactor having an inner diameter of 6 mm and a tube length of 30 m at flow rates of 40 L/hr, 15 L/hr, and 4.0 kg/hr, respectively.

The tubular reactor used here had a jacket portion based on a double tube, and the temperature at which a reaction liquid was discharged was kept at 40° C. or lower by passing cooling water through the jacket portion.

The reaction liquid ejected from the tubular reactor was continuously introduced into a tank type reactor with a baffle having a swept-back blade and an internal volume of 40 L. Further, the aqueous solution of sodium hydroxide containing BPA, a 25% by mass aqueous solution of sodium hydroxide, water, and a 1% by mass aqueous solution of triethylamine were added to the liquid at flow rates of 2.8 L/hr, 0.07 L/hr, 17 L/hr, and 0.64 L/hr, respectively so that a reaction was performed. The reaction liquid flooding out of the tank type reactor was continuously extracted, and was left at rest so that an aqueous phase was separated and removed, and a methylene chloride phase was collected.

A polycarbonate oligomer thus obtained was present at a concentration of 320 g/L, and had a chloroformate group at a concentration of 0.75 mol/L.

Polymerizing Step

15 L of the above oligomer solution, 9.0 L of methylene chloride, 191 g of p-tert-butylphenol (hereinafter abbreviated as "PTBP"), and 3.0 mL of triethylamine were loaded into a 50-L tank type reactor provided with a baffle board, a paddle type stirring blade, and a cooling jacket. While the mixture was stirred, a potassium hydroxide solution containing bisphenol M (which may hereinafter be abbreviated as "BPM") (solution prepared by dissolving 973 g of BPM in an aqueous solution prepared by dissolving 520 g of KOH and 1.9 g of sodium dithionite in 5.5 L of water) was charged into the mixture so that a reaction between the polycarbonate oligomer and BPM was performed for 10 minutes.

An aqueous solution of sodium hydroxide containing BPA (solution prepared by dissolving 513 g of BPA in an aqueous solution prepared by dissolving 306 g of NaOH and 1.0 g of sodium dithionite in 4.5 L of water) was added to the polymer liquid, and the mixture was subjected to a polymerization reaction for 50 minutes.

10 L of methylene chloride for dilution were charged into the mixture, and the whole was stirred for 10 minutes. After that, the resultant was separated into an organic phase containing polycarbonate and an aqueous phase containing excessive amounts of BPA and NaOH, and the organic phase was isolated.

A solution of the polycarbonate copolymer in methylene chloride thus obtained was sequentially washed with an aqueous solution of 0.03 mol/L NaOH and 0.2 mol/L hydrochloric acid, the aqueous solution and hydrochloric acid each having a volume corresponding to 15 vol % of the volume of the solution of the polycarbonate copolymer. Next, the resultant was repeatedly washed with pure water until an electric conductivity in an aqueous phase after the washing became 0.01 μS/m or less.

The solution of the polycarbonate copolymer in methylene chloride obtained by the washing was concentrated and pulverized, and the resultant flake was dried under reduced pressure at 100°.

A molar ratio between repeating units each derived from BPM and repeating units each derived from BPA in the copolymer determined by NMR was 12:88.

0.05 part by mass of a phosphorus antioxidant (manufactured by ASAHI CORPORATION.; trade name ADEKASTAB PEP36) was blended into 100 parts by mass of the copolymer, and the mixture was granulated with an extruder of 40 mmφ with a vent while the temperature of the copolymer as a resin was set to 250° C., whereby Pellet (A) was obtained.

Production Example 2

Pellet (B) was obtained in the same manner as in Production Example 1 except that: the addition amount of the aqueous solution of potassium hydroxide containing bisphenol M was changed as described below; and the addition of the aqueous solution of sodium hydroxide containing bisphenol A was not performed.

A molar ratio between repeating units each derived from bisphenol M and repeating units each derived from bisphenol A in the copolymer determined by NMR was 22:78.

(Aqueous Solution of Potassium Hydroxide Containing Bisphenol M)

A solution prepared by dissolving 1,738 g of bisphenol M in an aqueous solution prepared by dissolving 957 g of KOH and 1.9 g of sodium dithionite in 5.5 L of water Production Example 3

Pellet (C) was obtained in the same manner as in Production Example 2 except that the addition amount of PTBP was changed from 191 g to 160 g.

A molar ratio between repeating units each derived from bisphenol M and repeating units each derived from bisphenol A in the copolymer determined by NMR was 22:78.

Comparative Production Example 1

0.05 part by mass of an ADEKASTAB PEP36 [trade name, manufactured by ASAHI CORPORATION.] was blended into 100 parts by mass of a polycarbonate resin composed only of BPA and having a viscosity number of 39.4 (TARFLON FN1500 manufactured by Idemitsu Kosan Co., Ltd.), and the mixture was granulated with an extruder of 40 mmφ with a vent while the temperature of the resin was set to 250° C., whereby Pellet (D) was obtained.

Comparative Production Example 2

0.05 part by mass of an ADEKASTAB PEP36 [trade name, manufactured by ASAHI CORPORATION.] was blended into 100 parts by mass of a polycarbonate resin composed only of BPA and having a viscosity number of 44.0 (TARFLON FN1600 manufactured by Idemitsu Kosan Co., Ltd.), and the mixture was granulated with an extruder of 40 mmφ with a vent while the temperature of the resin was set to 250° C., whereby Pellet (E) was obtained.

Examples 1 to 4 and Comparative Examples 1 to 3

Pellets (A) to (E) obtained in the production examples and the comparative production examples described above were molded into light guide plates by injection molding under the following conditions.

Injection molder: SG100M-HP manufactured by Sumitomo Heavy Industries., Ltd.

Shape of light guide plate: A length of 54 mm, a width of 39 mm, and a thickness of 0.30 mm, 0.35 mm, or 0.50 mm Prism: V groove Evaluation (1) Viscosity Number The viscosity number of a light guide plate to be obtained in each of the examples and the comparative examples was measured in conformance with ISO 1628-4 (1999).

(2) Measurement of Chromaticity

Measuring apparatus: An edge type surface light source having a reflecting film placed on its bottom surface and four LED's placed at its ends was formed. A light guide plate was placed on the light source so that the prism pattern of the plate was on a lower surface side. A diffusing film and two luminance improving films were sequentially laminated on the resultant, whereby a sheet luminous body was constituted.

A voltage of 3.25 V per LED was applied so that each LED was lighted up at a current value of 10 mA. Chromaticity differences (x, y) were determined from a difference between the measured value of chromaticity at a position at a distance of 5 mm from a side opposite to a side on which light was incident and the measured value of chromaticity at a position at a distance of 5 mm from the side on which light was incident. The chromaticity differences are preferably small because the chromaticity difference between the portion opposite to the portion on which light is incident and the portion on which light is incident becomes small. Chromaticity measurement was performed with an Eye Scale 3 as a luminance/chromaticity measuring machine.

Table 1 summarizes the results of the evaluation.

TABLE 1

|  |  |  | Example 1 | Example 2 | Example 3 | Comparative Example 1 | Comparative Example 2 | Example 4 | Comparative Example 3 |
|---|---|---|---|---|---|---|---|---|---|
| Molding material | Pellet |  | (A) | (A) | (B) | (D) | (D) | (C) | (E) |
|  | BPM:BPA (Repeating units) | Molar ratio | 12:88 | 12:88 | 22:78 | 0:100 | 0:100 | 22:78 | 0:100 |
|  | Viscosity number |  | 39.4 | 39.4 | 39.4 | 39.4 | 39.4 | 43.9 | 43.9 |
| Molding conditions | Cylinder temperature | ° C. | 330 | 345 | 325 | 365 | 365 | 330 | 365 |
|  | Die temperature | ° C. | 120 | 120 | 100 | 120 | 120 | 120 | 120 |
|  | Injection speed | mm/sec | 1,900 | 1,900 | 1,900 | 2,000 | 2,000 | 1,900 | 2,000 |
| Light guide plate | Thickness on gate side | mm | 0.35 | 0.30 | 0.30 | 0.35 | — | 0.50 | 0.50 |
|  | Thickness on side opposite to gate side | mm | 0.35 | 0.30 | 0.30 | 0.35 | — | 0.50 | 0.50 |
|  | Chromaticity differences | x | 0.0081 | 0.0076 | 0.0068 | 0.0170 | — | 0.0083 | 0.0182 |
|  |  | y | 0.0075 | 0.0099 | 0.0055 | 0.0252 | — | 0.0088 | 0.0289 |

Comparative Example 2: Raw materials for a light guide plate having a thickness of 0.30 mm could not be loaded (could not be molded into the plate).

As shown in Table 1, the results of the examples based on the polycarbonate resin composition of the present invention reveal that the composition can be molded into a plate as thin as 0.30 mm by injection molding with better flowability at a lower cylinder temperature and a lower injection speed than those in the case where only an aromatic PC based on BPA is used. In addition, the light guide plates of the examples each have such high performance as described below: each plate has chromaticity differences each of which is as small as 0.01 or less.

INDUSTRIAL APPLICABILITY

According to the present invention, a thin light guide member such as a light guide plate having the following characteristics can be obtained by using a polycarbonate copolymer having a specific structure: the member is free from yellowing due to the thermal deterioration of the copolymer as a resin, and has a good color tone and a sufficient strength.

A thin illumination unit can be constituted by combining such light guide member and a light source, and can be suitably utilized as, for example, an illumination or design part in the backlight of a thin liquid crystal display apparatus, in a vehicle, in a housing, or in an interior.

The invention claimed is:

1. A method of guiding light comprising directing light through a light guide member comprising a polycarbonate copolymer having repeating units represented by the following formulae (I) and (II)

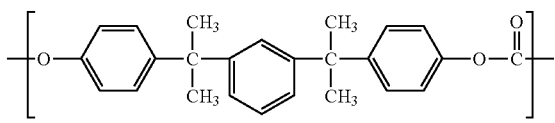

(I)

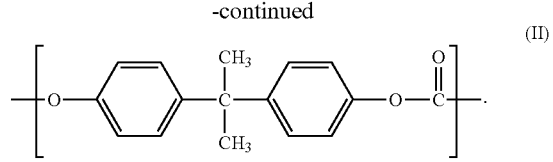

(II)

2. The method of guiding light according to claim 1, wherein the polycarbonate copolymer has a viscosity number of 30 to 70, wherein said viscosity number is a value measured in conformance with ISO 1628-4 (1999).

3. The method of guiding light according to claim 1, wherein the repeating units each represented by the formula (I) and the repeating units each represented by the formula (II) are contained at a molar ratio of 1:99 to 50:50.

4. The method of guiding light according to claim 2, wherein the repeating units each represented by the formula (I) and the repeating units each represented by the formula (II) are contained at a molar ratio of 1:99 to 50:50.

5. The method of guiding light according to claim 1, wherein the light guide member comprises a light guide plate.

6. The method of guiding light according to claim 2, wherein the light guide member comprises a light guide plate.

7. The method of guiding light according to claim 3, wherein the light guide member comprises a light guide plate.

8. The method of guiding light according to claim 1, wherein the light enters through a surface of the light guide member and exits through an opposite surface of the light guide member.

9. An illumination unit which guides light according to the method of guiding light of claim 1 from a light source through a polycarbonate copolymer.

* * * * *